United States Patent
Li et al.

(10) Patent No.: US 8,132,408 B2
(45) Date of Patent: Mar. 13, 2012

(54) ANNULAR INTERCOOLER HAVING CURVED FINS

(75) Inventors: Bin Li, Dunlap, IL (US); Mustafa Taha Al-Shawaf, Washington, IL (US); Rishabh Sinha, Peoria, IL (US); Deepak Bhupendrabhai Thakkar, Peoria, IL (US)

(73) Assignee: Caterpillar Inc., Peoria, IL (US)

( * ) Notice: Subject to any disclaimer, the term of this patent is extended or adjusted under 35 U.S.C. 154(b) by 681 days.

(21) Appl. No.: 11/987,528

(22) Filed: Nov. 30, 2007

(65) Prior Publication Data

US 2009/0139699 A1    Jun. 4, 2009

(51) Int. Cl.
| F02B 33/44 | (2006.01) |
| F02B 33/00 | (2006.01) |
| F24B 1/06 | (2006.01) |
| F28F 1/02 | (2006.01) |
| F28F 13/12 | (2006.01) |
| F28F 1/34 | (2006.01) |

(52) U.S. Cl. ............................ 60/612; 123/563; 165/125

(58) Field of Classification Search .................. 60/612; 123/562–564; 165/125, 121, 122, 41, DIG. 357, 165/85–86; 415/179; F02B 29/04; F28D 7/00; F28F 1/02, 1/34

See application file for complete search history.

(56) References Cited

U.S. PATENT DOCUMENTS

| 1,087,382 | A |   | 2/1914 | Kieser ............................. 415/179 |
| 1,088,585 | A |   | 2/1914 | Junkers |
| 1,265,650 | A |   | 5/1918 | Graemiger |
| 1,403,319 | A | * | 1/1922 | Harter ............................ 165/125 |
| 2,368,732 | A | * | 2/1945 | Wallgren ....................... 165/125 |
| 2,970,812 | A | * | 2/1961 | Kritzer .......................... 165/152 |
| 3,233,866 | A |   | 2/1966 | Davidovic ....................... 415/79 |
| 3,424,234 | A |   | 1/1969 | Laing ............................. 165/89 |
| 3,469,625 | A |   | 9/1969 | Phillips ......................... 165/125 |
| 3,642,062 | A | * | 2/1972 | Edmaier et al. ................ 165/125 |
| 3,811,495 | A | * | 5/1974 | Laing .............................. 165/85 |
| 4,073,338 | A |   | 2/1978 | Fujikake et al. ................ 165/86 |
| 4,431,050 | A |   | 2/1984 | Martin .......................... 165/166 |
| 5,445,218 | A |   | 8/1995 | Nieh ............................. 165/125 |
| 6,446,712 | B1 |   | 9/2002 | Wu et al. ....................... 165/167 |
| RE38,181 | E | * | 7/2003 | Kadle et al. .......... 165/DIG. 357 |
| 6,764,279 | B2 |   | 7/2004 | Meshenky |
| 6,857,468 | B2 | * | 2/2005 | Emrich ......................... 165/125 |
| 6,948,909 | B2 |   | 9/2005 | Meshenky et al. |

(Continued)

FOREIGN PATENT DOCUMENTS

DE    102006011062    9/2007

(Continued)

OTHER PUBLICATIONS

Porter et al., U.S. Appl. No. 60/960,419, filed Sep. 28, 2007.

*Primary Examiner* — Thai Ba Trieu

(74) *Attorney, Agent, or Firm* — Finnegan, Henderson, Farabow, Garrett & Dunner LLP

(57) ABSTRACT

An air-to-fluid intercooler is disclosed. The air-to-fluid intercooler may include a core assembly including an outer circumference and an inner circumference, at least one annular tube body configured to direct flow of a cooling fluid within the core assembly, and at least one curved fin coupled to an exterior surface of the at least one annular tube body and configured to direct a flow of charge air through the core assembly.

17 Claims, 4 Drawing Sheets

U.S. PATENT DOCUMENTS

| | | |
|---|---|---|
| 7,077,113 B2 | 7/2006 | Bilek et al. |
| 7,172,016 B2 | 2/2007 | Meshenky et al. |
| 7,278,472 B2 | 10/2007 | Meshenky et al. ............ 165/125 |
| 7,400,503 B2 * | 7/2008 | Crocker et al. ............. 165/80.4 |
| 2004/0055740 A1 | 3/2004 | Meshenky et al. ............ 165/125 |
| 2004/0065433 A1 | 4/2004 | Meshenky et al. |
| 2005/0058535 A1 | 3/2005 | Meshenky et al. ......... 415/121.3 |
| 2007/0263354 A1 * | 11/2007 | Crocker et al. ............... 361/699 |
| 2008/0142194 A1 * | 6/2008 | Zhou et al. ................... 165/80.3 |
| 2008/0223551 A1 * | 9/2008 | Otsuki et al. ................ 165/80.3 |
| 2009/0120613 A1 * | 5/2009 | Chen et al. ................... 165/80.3 |
| 2009/0145584 A1 * | 6/2009 | Walsh et al. ................. 165/122 |

FOREIGN PATENT DOCUMENTS

| | | |
|---|---|---|
| EP | 1288604 | 3/2003 |
| EP | 1 426 576 A2 | 6/2004 |
| GB | 1 210 185 | * 10/1970 |

* cited by examiner

ANNULAR INTERCOOLER HAVING CURVED FINS

TECHNICAL FIELD

The present disclosure is directed to an intercooler and, more particularly, an annular intercooler having curved fins.

BACKGROUND

Construction and earthmoving equipment, as well as many other types of machines, are commonly used in a wide variety of applications. Generally, a machine is powered by an internal combustion engine. In order to enhance the performance of the machine, the engine must perform as efficiently as possible. Because many machines are powered by internal combustion engines, various methods have been developed to increase internal combustion engine efficiency. One method has been to incorporate a two-stage or twin-compressor turbocharger into the internal combustion engine. The turbocharger may compress air prior to entering an engine intake or combustion chamber. Supplying the engine intake with compressed air ("charge air") may allow for more complete combustion. This may result in improved power density and better engine efficiency. However, compressing the air may also cause an increase in the intake air temperature. Supplying the engine intake with such heated charge air may lead to an undesirable increase in the amount of emissions exiting from the engine. Also, because engines generally produce large quantities of heat already, adding heated charge air to the engine intake or combustion chamber may increase the operating temperature of the engine, thus resulting in excessive wear on engine components.

An air-to-fluid intercooler may be disposed between a first stage compressor and a second stage compressor of the twin-compressor turbocharger and be used to reduce smoke and other engine emissions, such as, nitrous oxides, by cooling the charge air from the first stage compressor before it enters the second stage compressor and, ultimately, the engine intake manifold. Using the air-to-fluid intercooler may also result in lower combustion temperatures, thus improving engine component life by reducing thermal stress on the engine and increasing engine power output. Also, disposing the intercooler between the first stage compressor and second stage compressor may increase the component life and efficiency of the second stage compressor.

The air-to-fluid intercooler may include one or more passages configured to direct flow of heated charge air. The passages may contain heat transfer enhancements, such as, one or more fins, dimples or other surface modifications. The passages may be coupled to an annular tube body configured to direct flow of some type of cooling fluid, for example, a liquid coolant, which may cool the passage. As the heated charge air passes through the passage, it may come into contact with the heat transfer enhancements, such as, fins, of the passage body. Heat may be transferred from the charge air to the fins of the passage, and then from the fins into the liquid coolant, thus removing heat from the charge air.

The flow of charge air from the first stage compressor may enter the air-to-fluid intercooler in a swirling motion. As the flow of charge air enters the passages of the air-to-fluid intercooler, the fins of the passages may disrupt and change the flow direction of the charge air, resulting in a pressure drop of the charge air and ultimately poor engine performance. Also, radial and axial space and size limitations may exist because the air-to-fluid intercooler may be disposed between the first stage compressor and the second stage compressor. Therefore, the heated charge air may flow in the passage of the air-to-fluid intercooler for an inadequate duration resulting in poor heat exchange performance.

One method of improving the performance of an air-to-fluid intercooler under such conditions is described in U.S. Pat. No. 7,278,472 (the '472 patent) to Meshenky et al., issued on Oct. 9, 2007. The '472 patent describes a heat exchanger used as an intercooler in a combustion air charging device such as a turbocharger or a supercharger. The heat exchanger is disposed in a housing and between a compressor wheel and an outlet. The heat exchanger has a donut-shaped core. The core includes a gas flow path with a substantial radial extent and a gas inlet in fluid communication with the compressor wheel and a gas outlet in fluid communication with the housing outlet. A coolant flow path is provided in the intercooler in heat exchange with the gas flow path and has a substantial axial extent. Flattened tubes are also employed in the core and are arranged tangential to a circle concentric with the center for the core. The canting of the flattened tubes is against the direction of swirling charge air flow entering the intercooler and provides a smoother transition of the air flow into the spaces between the tubes to minimize turning losses of the air flow, and thereby reduce pressure loss.

Although the intercooler of the '472 patent may improve performance of an air-to-fluid intercooler, it may have limitations. For example, because of the canted configuration of the flattened tubes, the swirling flow of charge air will still be disrupted. The passages created by the flattened tubes will not accommodate the swirling direction of the charge air as air flow and direction would be interrupted by the tangential walls of the tubes, ultimately resulting in a pressure loss. Also, the passages formed by the tubes do not create adequate air flow length for charge air to flow and undergo cooling.

The air-to-fluid intercooler of the present disclosure is directed towards improvements in the existing technology.

SUMMARY OF THE DISCLOSURE

One aspect of the present disclosure is directed to an air-to-fluid intercooler. The air-to-fluid intercooler may include a core assembly including an outer circumference and an inner circumference, at least one annular tube body configured to direct flow of a cooling fluid within the core assembly, and at least one curved fin coupled to an exterior surface of the at least one annular tube body and configured to direct a flow of charge air through the core assembly.

Another aspect of the present disclosure is directed to a method for cooling compressed charge air with an air-to-fluid intercooler, the air-to-fluid intercooler including a core assembly, an outer circumference, and an inner circumference. The method may include directing a flow of cooling fluid to the core assembly though at least one annular tube body and directing a flow of compressed charge air with at least one curved fin coupled to an exterior surface of the at least one annular tube body.

DETAILED DESCRIPTION

Figure 1:
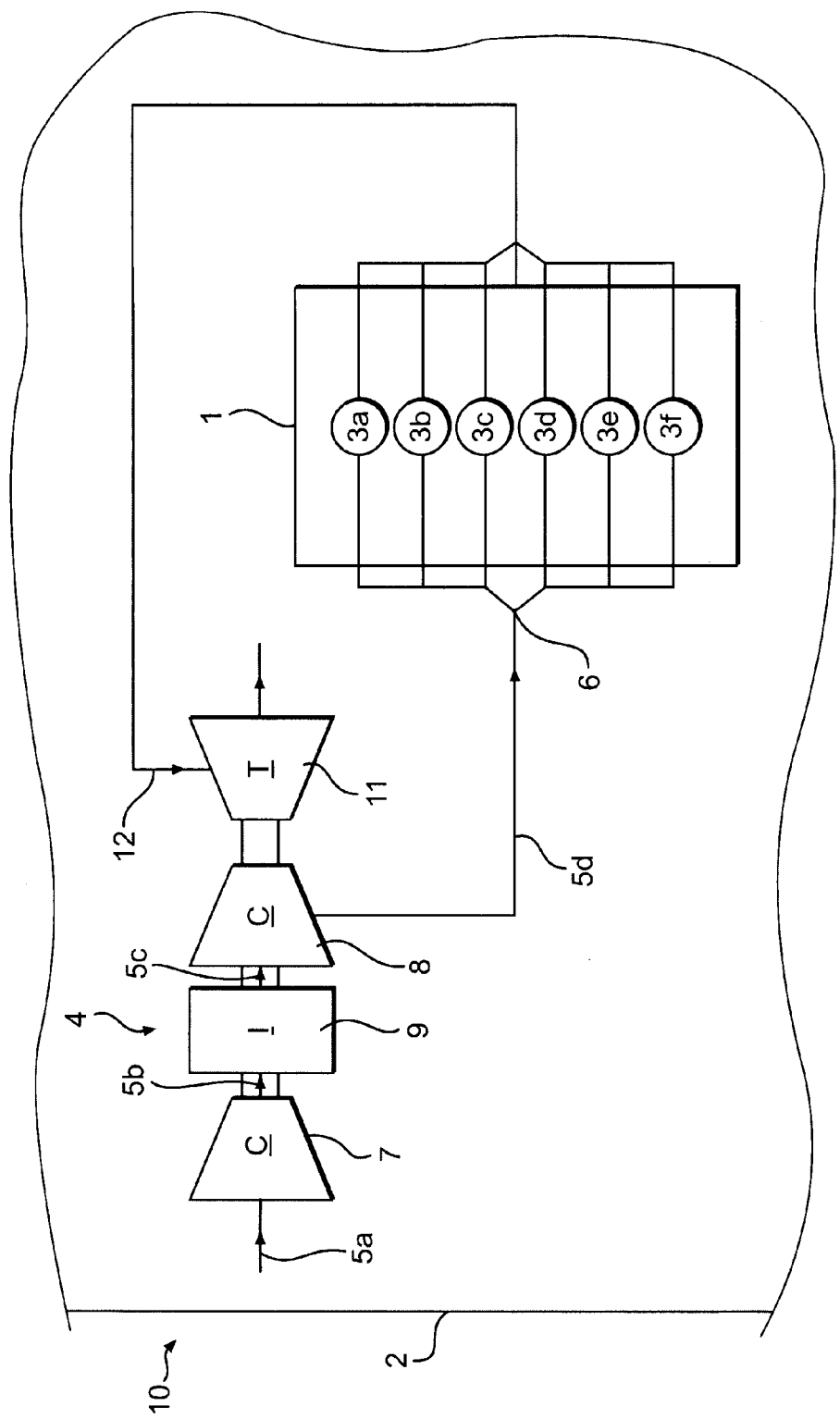
FIG. 1 is a diagrammatic illustration of a machine provided with an air-to-fluid intercooler according to an exemplary disclosed embodiment.

FIG. 1 diagrammatically illustrates an exemplary machine 10. The outline 2 represents a portion of the chassis of the machine 10. An engine 1 may be mounted on the chassis 2. Engine 1 may be any type of engine, for example, an internal combustion engine of the gas, diesel, and/or gaseous fuel type. In the illustrative example, engine 1 is shown with six combustion chambers 3a-3f for generating power, each provided with a piston, one or more intake valves, one or more exhaust valves, and other components (not shown) known to those having skill in the art. Engine 1 may include a turbocharger 4 for compressing intake air 5a to form compressed charge air. Turbocharger 4 may be a twin-compressor turbocharger including a first stage compressor 7 and a second stage compressor 8. Due to the heat of compression from first stage compressor 7, the compressed charge air exits first stage compressor 7 as heated charge air 5b and is directed to an air-to-fluid intercooler 9, where the fluid may be a cooling fluid, such as, a liquid coolant or a gaseous fluid. Air-to-fluid intercooler 9 cools heated charge air 5b prior to entering second stage compressor 8 and ultimately an air intake manifold 6. In this embodiment one turbocharger 4 with a first stage compressor 7 and a second stage compressor 8 is illustrated, but it will be understood that the number of turbochargers or the number of compressors could be one or more than one and still fall within the scope of this disclosure. Furthermore, expedients other than turbochargers, such as an engine driven supercharger or superchargers, may be employed to compress intake air 5a, forming heated charge air 5b.

First stage compressor 7 and second stage compressor 8 may be powered by a turbine 11 driven by engine exhaust flow 12. First stage compressor 7 may pressurize intake air 5a to allow a greater mass of fuel/air mixture in the engine cylinders of engine 1. The result may be an increase in power and improved engine efficiency. However, as a byproduct of pressurization, the temperature of intake air 5a may also increase, which may be undesirable. The compressed intake air exiting first stage compressor 7 may conveniently be referred to as heated charge air 5b. As noted above, heated charge air 5b may be cooled prior to entering second stage compressor 8 by passing through air-to-fluid intercooler 9. Air-to-fluid intercooler 9 may be provided downstream of first stage compressor 7 and upstream of second stage compressor 8 and air intake manifold 6. Once cooled charge air 5c exits air-to-fluid intercooler 9, it undergoes a second compression event by second stage compressor 8 and exits as combustion air 5d before entering air intake manifold 6 to further increase the mass of the fuel/air mixture in the combustion chambers 3a-3f. Although not shown, it will be understood by those skilled in the art that combustion air 5d may exit second stage compressor 8 of turbocharger 4 and enter another heat exchanger, such as, an air-to-air aftercooler, prior to entering air intake manifold 6.

Figure 2:
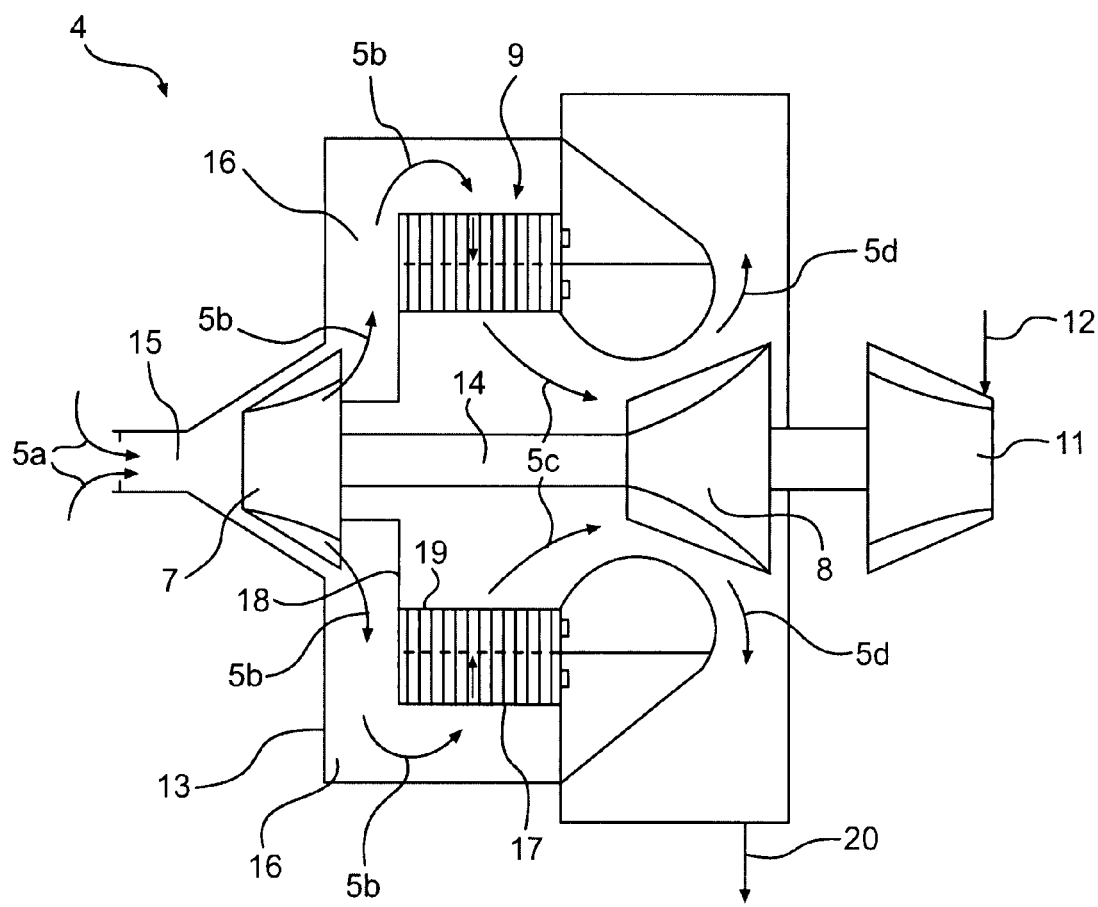
FIG. 2 is a diagrammatic view of an air-to-fluid intercooler employed in a twin-compressor turbocharger according to an exemplary disclosed embodiment.

FIG. 2 illustrates an exemplary embodiment of how air-to-fluid intercooler 9 may be configured. Turbocharger 4 may include a housing 13 configured to enclose first stage compressor 7 and second stage compressor 8 of rotary shaft 14 and air-to-fluid intercooler 9 operatively connected between first stage compressor 7 and second stage compressor 8. First stage compressor 7 and second stage compressor 8 may embody wheels, as shown, or other suitable expedients. Rotary shaft 14 may also include a turbine wheel 11 configured to be driven by engine exhaust flow 12 and to subsequently drive rotary shaft 14.

Housing 13 may also include an intake air inlet 15 configured to direct intake air 5a to the inlet side of first stage compressor 7 of turbocharger 4. A combustion air outlet 20, on the outlet side of second stage compressor 8, may be configured to expel combustion air 5d.

Intake air 5a may enter intake air inlet 15 and flow to the inlet side of first stage compressor 7. As exhaust flow 12 drives turbine wheel 11 and rotary shaft 14, first stage compressor 7 may compress intake air 5a to heated charge air 5b. Heated charge air 5b may exit first stage compressor 7 radially outward and in a swirling motion. Heated charge air 5b may continue to flow through space 16 of housing 13 and enter an outer circumference 17 of air-to-fluid intercooler 9. Heated charge air 5b may then pass through a core assembly 18 of air-to-fluid intercooler 9 in a radially inward direction and be cooled by cooling fluid that flows through core assembly 18, which will be explained in later embodiments. Once cooled, heated charge air 5b may exit an inner circumference 19 of air-to-fluid intercooler 9 as cooled charge air 5c and flow towards the inlet side of second stage compressor 8 in a swirling motion, preserving the kinetic energy from the first stage compression. Cooled charge air 5c then undergoes further compression and exits as combustion air 5d. Combustion air 5d is then discharged from turbocharger 4 through combustion air outlet 20 and to air intake manifold 6 as shown in FIG. 1.

Figure 3:
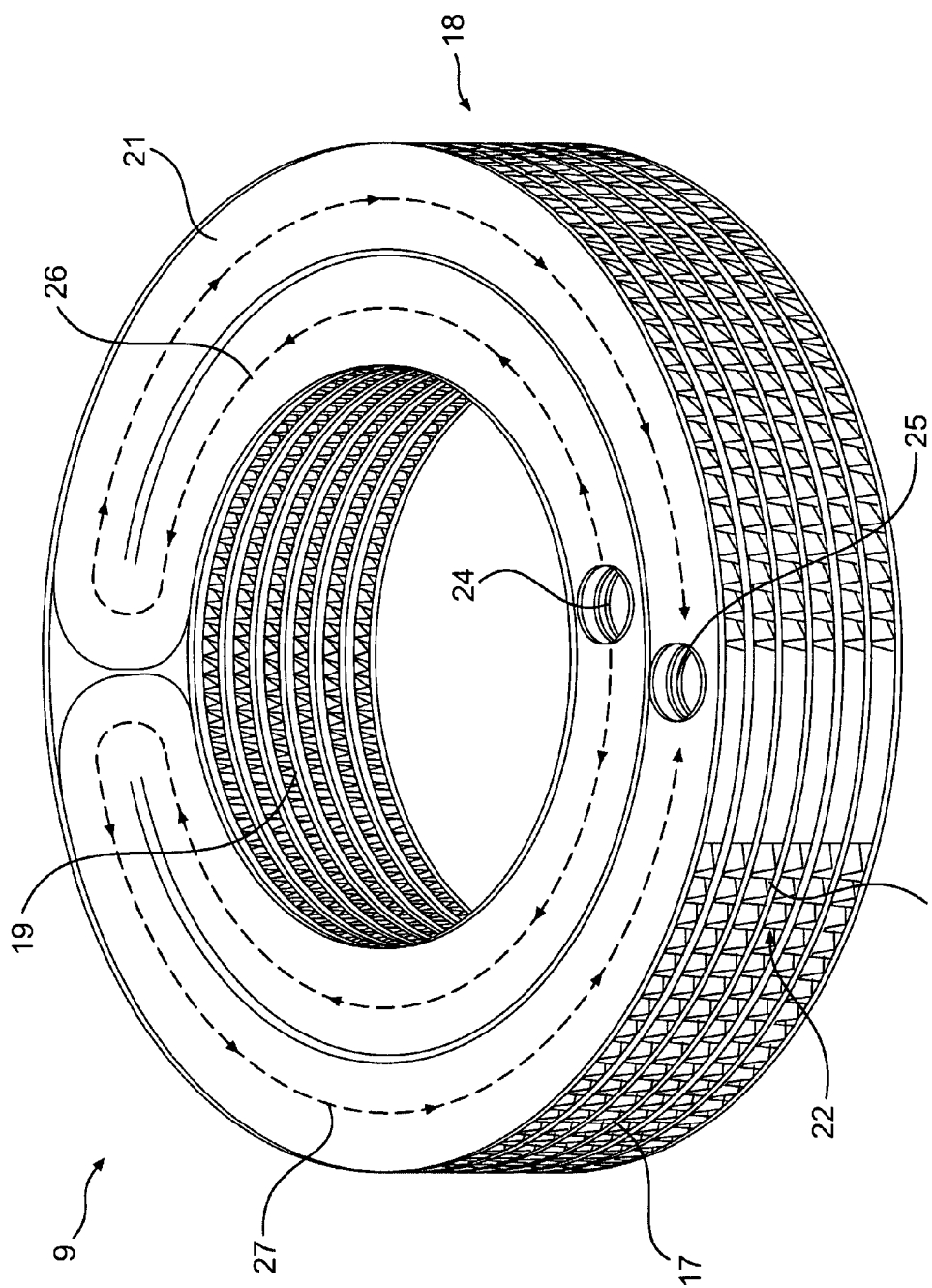
FIG. 3 is a diagrammatic view of an air-to-fluid intercooler for a machine according to an exemplary disclosed embodiment.
Figure 4:
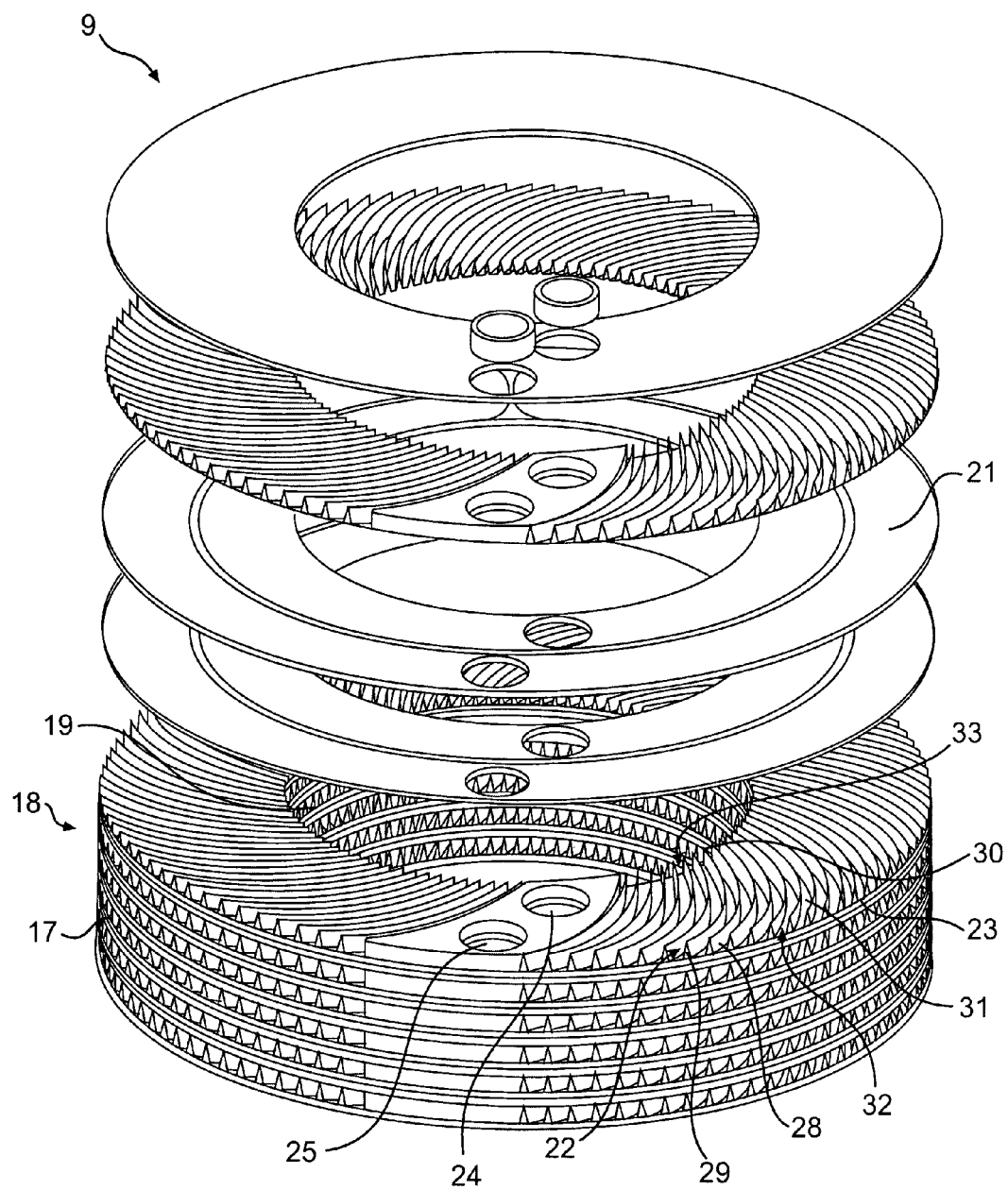
FIG. 4 is a sectional view of an air-to-fluid intercooler for a machine according to an exemplary disclosed embodiment.

An exemplary embodiment of air-to-fluid intercooler 9 will be described in greater detail as illustrated in FIG. 3 and FIG. 4. Core assembly 18 of air-to-fluid intercooler 9 may include an outer circumference 17 and an inner circumference 19, as discussed in the previous embodiment of FIG. 2. Air-to-fluid intercooler 9 may also include at least one cooling fluid passage, such as, annular tube body 21, and at least one curved fin 22. Curved fin 22 may be coupled to exterior surface 23 of annular tube body 21 and may be configured to direct flow of heated charge air 5b. Core assembly 18 may also include a plurality of annular tube bodies 21 and curved fins 22 axially assembled. An inlet tube 24 and an outlet tube 25 may be associated with core assembly 18. Inlet tube 24 may be configured to direct a cooling fluid into annular tube body 21, and outlet tube 25 may be configured to direct the cooling fluid out of annular tube body 21. It is contemplated that inlet tube 24 may be located closer to a central axis of core assembly 18 than outlet tube 25. Inlet tube 24 may be angularly offset from outlet tube 25 with respect to the central axis.

As shown in FIG. 3, an inlet cooling fluid flow 26 from inlet tube 24 may split and pass in a radially inner direction of annular tube body 21. Inlet cooling fluid flow 26 may then reverse direction and become an outlet cooling fluid flow 27, passing in a radially outer direction of annular tube body 21 to outlet tube 25. Therefore, inlet cooling fluid flow 26 may be directed to inner circumference 19 of air-to-fluid intercooler 9 and provide further cooling of heated charge air 5b that has already been cooled by the outlet cooling fluid flow 27 at the outer circumference 17. Although not shown, it will be understood that annular tube body 21 may be configured to direct cooling fluid in other flow directions, such as, cross flow, parallel flow, multi-pass flow, and counter flow.

As shown in FIG. 4, curved fin 22 may form a radially extending arced member 28 including a first end 29 associated with outer circumference 17 of air-to-fluid intercooler 9 and a second end 30 associated with inner circumference 19 of air-to-fluid intercooler 9. Arced member 28 may also be configured to curve in a direction with the flow of heated charge air 5*b*. An additional curved fin 22 may be coupled to external surface 23 of annular tube body 21 and form a passage 31 with an adjacent curved fin 22. Passage 31 may include a first aperture 32 associated with outer circumference 17 serving as an inlet for heated charge air 5*b* and a second aperture 33 associated with inner circumference 19 serving as an outlet for cooled charge air 5*c*. Although not shown in FIG. 3 and FIG. 4, it will be understood that expedients other than fins, such as, dimples or other surface enhancements having a curved configuration, may be employed to direct flow of heated charge air 5*b* and transfer heat from charge air to the cooling fluid.

INDUSTRIAL APPLICABILITY

The disclosed exemplary air-to-fluid intercooler 9 may have applicability with internal combustion engines. In particular, and as shown in FIG. 1 and FIG. 2, air-to-fluid intercooler 9 may serve to cool a flow of heated charge air 5*b* exiting first stage compressor 7 of a turbocharger 4 before it enters second stage compressor 8 and ultimately air intake manifold 6 of an engine 1, thus decreasing the level of emissions, increasing the life of engine components, and increasing engine power density.

In a machine 10, exhaust flow 12 leaving engine 1 may be directed towards a turbine wheel 11 of turbocharger 4. The flow of exhaust 12 may power turbine wheel 11, causing rotary shaft 14 to rotate and drive first stage compressor 7 and second stage compressor 8. Intake air 5*a* may be directed into first stage compressor 7 where it may undergo compression, and as a byproduct of compression, intake air 5*a* may also be heated into heated charge air 5*b*. Heated charge air 5*b* may flow from first stage compressor 7 in a swirling motion and into outer circumference 17 of air-to-fluid intercooler 9. As shown in FIG. 3 and FIG. 4, heated charge air 5*b* may enter air-to-fluid intercooler 9 through first aperture 32 of passage 31. Arced members 28 forming curved fins 22 of passage 31 curve in the direction of heated charge air 5*b* flow. Therefore, curved fins 22 may direct and maintain the swirling flow of heated charge air 5*b*, preventing significant changes in flow direction and ultimately a pressure drop of heated charge air 5*b*. Curved fins 22 of passage 31 may be coupled to an annular tube body 21 configured to direct flow of some type of cooling fluid, for example, a liquid coolant, which may cool passage 31. As heated charge air 5*b* passes through passage 31, it may come into contact with curved fins 22 of passage 31. Heat may be transferred from heated charge air 5*b* to curved fins 22 of passage 31, and then from curved fins 22 into the liquid coolant, thus removing heat from heated charge air 5*b*. Passage 31 formed by curved fins 22 may have a longer passage than compared to a similar passage formed by fins having a straight configuration. Therefore, passage 31 may expose heated charge air 5*b* to cooling for a longer period, improving heat exchanging performance. Once cooled, heated charge air 5*b* may be discharged from inner circumference 19 of air-to-fluid intercooler 9 as cooled charge air 5*c* to second stage compressor 8 where it undergoes further compression. Curved fins 22 of passage 31 may maintain the swirling motion of heated charge air 5*b*, and subsequently, cooled charge air 5*c* exiting second aperture 33 of passage 31 associated with inner circumference 19 may continue to flow in the swirling motion. The maintained swirling flow of cooled charge air 5*c* may form a smooth transition into second stage compressor 8 and save rotational kinetic energy as second stage compressor 8 may rotate in the same direction as the swirling flow. Compressed, cooled charge air 5*c* may exit second stage compressor 8 as combustion air 5*d* and then be discharged from turbocharger 4 through combustion air outlet 20. Combustion air 5*d* may be mixed with fuel within one or more combustion chambers 3*a*-3*f* within engine 1. Because cooler air has greater density than heated air, a volume of combustion air 5*d* at a certain pressure may contain a greater number of air molecules than the same volume of heated charge air 5*b* at that same pressure. Increasing the number of air molecules in combustion chambers 3*a*-3*f* of engine may decrease the amount of smoke and/or emissions exiting from engine 1, improve engine performance, and improve engine efficiency. Also, reducing the temperature of heated charge air 5*b* may decrease the operating temperature of engine 1, thus resulting in less wear on engine components.

Assembling curved fins 22 to core assembly 18 of air-to-fluid intercooler 9 may enhance cooled charge air 5*c* entering second stage compressor 8 and ultimately combustion air 5*d* entering combustion chambers 3*a*-3*f* within engine 1. Curved fin 22 may maintain the swirling flow of heated charge air 5*b* entering air-to-fluid intercooler 9, preventing a pressure drop and decrease in density of cooled charge air 5*c* exiting air-to-fluid intercooler 9. Also, passage 31 formed by curved fins 22 may expose heated charge air 5*b* to a longer period of cooling, increasing the density and the number of air molecules of cooled charge air 5*c*.

It will be apparent to those skilled in the art that various modifications and variations can be made to the air-to-fluid intercooler of the present disclosure without departing from the scope of the disclosure. Other embodiments will be apparent to those skilled in the art from consideration of the specification and practice of the embodiments disclosed herein. It is intended that the specification and examples be considered as exemplary only, with a true scope of the disclosure being indicated by the following claims.

What is claimed is:

1. A method for cooling compressed charge air with an air-to-fluid intercooler, the air-to-fluid intercooler including a core assembly defining a central axis, an outer circumference, and an inner circumference, the method comprising:

directing a flow of cooling fluid to the core assembly though a first annular tube body via an inlet and via a first circumferential passage fluidly connected to a second circumferential passage, the flow of cooling fluid exiting the annular tube body via an outlet, the second circumferential passage being circumferentially larger than the first circumferential passage, wherein the inlet is located closer to the central axis than the outlet, the inlet being angularly offset from the outlet with respect to the central axis;

directing a flow of cooling fluid to the core assembly through a second annular tube body; and directing a flow of compressed charge air through a passage, a first surface of the passage being formed by an exterior surface of the first annular tube body, a second surface of the passage opposite the first surface being formed by an exterior surface of the second annular tube body, third and fourth surfaces of the passage being formed by two curved fins coupled to the exterior surface of at least one of the first annular tube body or the second annular tube body.

2. The method of claim 1, wherein directing the flow of compressed charge air includes directing the flow from a first end of the curved fins adjacent to the outer circumference of the air-to-fluid intercooler to a second end of the curved fins adjacent to the inner circumference of the air-to-fluid intercooler.

3. The method of claim 2, wherein directing the flow of compressed charge air includes substantially maintaining a flow direction of the flow of compressed charge air as the flow of compressed charge air enters the intercooler.

4. The method of claim 3, wherein the passage includes a first aperture associated with the outer circumference and a second aperture associated with the inner circumference.

5. The method of claim 1, wherein the inlet is configured to direct cooling fluid into the first annular tube body and the second annular tube body.

6. The method of claim 5, wherein the outlet is configured to direct cooling fluid out of the first annular tube body and the second annular tube body.

7. The method of claim 6, further including directing the flow cooling fluid through a plurality of annular tube bodies and curved fins to the core assembly.

8. An air-to-fluid intercooler, comprising:
a core assembly defining a central axis and including an outer circumference and an inner circumference;
a first annular tube body including a first circumferential passage fluidly connected to a second circumferential passage, the second circumferential passage being circumferentially larger than the first circumferential passage, the annular tube body being configured to direct flow of a cooling fluid within the core assembly;
a second annular tube body configured to direct flow of a cooling fluid within the core assembly;
an inlet tube associated with the core assembly and configured to direct cooling fluid into at least one of the first annular tube body and alternatively the second annular tube body;
an outlet tube associated with the core assembly and configured to direct cooling fluid out of at least one of the first annular tube body and alternatively the second annular tube body,
wherein the inlet tube is located closer to the central axis than the outlet tube, the inlet tube being angularly offset from the outlet tube with respect to the central axis; and
at least one curved fin located between the first annular tube body and the second annular tube body, the at least one curved fin being coupled to an exterior surface of the first annular tube body and configured to direct a flow of charge air through the core assembly, wherein the at least one curved fin curves in the direction of the flow of charge air entering the intercooler.

9. The air-to-fluid intercooler of claim 8, wherein the at least one curved fin extends from a first end associated with the outer circumference to a second end associated with the inner circumference.

10. The air-to-fluid intercooler of claim 9, including at least one additional curved fin coupled to the exterior surface of the first annular tube body.

11. The air-to-fluid intercooler of claim 10, wherein the additional curved fin and an adjacent curved fin form a passage, the passage including a first aperture associated with the outer circumference and a second aperture associated with the inner circumference.

12. The air-to-fluid intercooler of claim 8, wherein the core assembly includes a plurality of annular tube bodies and curved fins axially assembled.

13. An engine assembly, comprising:
an engine air intake manifold;
a multi-compressor turbocharger configured to compress charge air before it enters the engine air intake manifold, the multi-compressor turbocharger including:
a housing including at least one intake air inlet and at least one combustion air outlet;
a rotary shaft extending through the housing, the rotary shaft including at least two compressors and a turbine wheel mounted thereon; and
an air-to-fluid intercooler operatively connected between the at least two compressors, the air-to-fluid intercooler including:
a core assembly defining a central axis and including an outer circumference and an inner circumference;
a first annular tube body including a first circumferential passage fluidly connected to a second circumferential passage, the second circumferential passage being circumferentially larger than the first circumferential passage;
a second annular tube body, the first annular tube body and second annular tube body being axially assembled to the core assembly and configured to direct flow of a cooling fluid within the core assembly;
an inlet tube associated with the core assembly and configured to direct fluid into at least one of the first annular tube body and alternatively the second annular tube body;
an outlet tube associated with the core assembly and configured to direct fluid out of at least one of the first annular tube body and alternatively the second annular tube body,
wherein the inlet tube is located closer to the central axis than the outlet tube, the inlet tube being angularly offset from the outlet tube with respect to the central axis; and
a curved fin located between the first annular tube body and the second annular tube body, the curved fin being coupled to an exterior surface of at least one of the first annular tube body or the second annular tube body and configured to direct a flow of charge air through the core assembly, wherein the curved fin curves in the direction of the flow of charge air entering the intercooler.

14. The engine assembly of claim 13, wherein the curved fin extends from a first end associated with the outer circumference to a second end associated with the inner circumference.

15. The engine assembly of claim 14, further including a plurality of adjacent curved fins coupled to the exterior surface of at least one of the first annular tube body or the second annular tube body to form passages, the passages including a first aperture associated with the outer circumference and a second aperture associated with the inner circumference.

16. The air-to-fluid intercooler of claim 15, wherein the plurality of curved fins is are located circumferentially around the exterior surface of at least one of the first annular tube body or the second annular tube body.

17. The engine assembly of claim 13, wherein the air-to-fluid intercooler includes a second curved fin located between the first annular tube body and the second annular tube body, wherein an exterior surface of the first annular tube body, an exterior surface of the second annular tube body, the curved fin, and the second curved fin form a passage.

* * * * *